(12) United States Patent
Karoji

(10) Patent No.: US 10,061,741 B2
(45) Date of Patent: Aug. 28, 2018

(54) GRAPH DISPLAY APPARATUS, GRAPH DISPLAY METHOD AND PROGRAM RECORDING MEDIUM

(71) Applicant: CASIO COMPUTER CO., LTD., Shibuya-ku, Tokyo (JP)

(72) Inventor: Kosuke Karoji, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/807,702

(22) Filed: Jul. 23, 2015

(65) Prior Publication Data
US 2016/0041944 A1    Feb. 11, 2016

(30) Foreign Application Priority Data

Aug. 7, 2014  (JP) ................. 2014-161720

(51) Int. Cl.
*G06F 15/02* (2006.01)
*G06T 11/20* (2006.01)

(52) U.S. Cl.
CPC ........ *G06F 15/0225* (2013.01); *G06T 11/206* (2013.01)

(58) Field of Classification Search
CPC ............. G06F 15/0225; G06F 3/04847; G06F 3/04895; G06T 11/206; G09B 19/025
See application file for complete search history.

(56) References Cited

U.S. PATENT DOCUMENTS

| | | | |
|---|---|---|---|
| 3,789,203 A | 1/1974 | Catherall et al. | |
| 4,217,702 A | 8/1980 | Bennett | |
| 4,794,553 A | 12/1988 | Watanabe et al. | |
| 5,136,690 A | 8/1992 | Becker et al. | |
| 5,289,205 A | 2/1994 | Torres | |
| 5,303,338 A | 4/1994 | Handa et al. | |
| 5,510,995 A | 4/1996 | Oliver | |

(Continued)

FOREIGN PATENT DOCUMENTS

| | | |
|---|---|---|
| CN | 101030119 A | 9/2007 |
| JP | 06052278 A | 2/1994 |

(Continued)

OTHER PUBLICATIONS ("Getting Started With Desmos." pp. 1-10 . Feb. 22, 2013. Web. https://web.archive.org/web/20130202223057/http://s3.amazonaws.com/desmos/Desmos_Calculator_User_Guide.pdf.*

(Continued)

*Primary Examiner* — Zhengxi Liu
*Assistant Examiner* — Scott E Sonners
(74) *Attorney, Agent, or Firm* — Holtz, Holtz & Volek PC

(57) ABSTRACT

A graph display apparatus includes a display unit and a processor. The display unit includes a display screen. The processor performs following processes of: determining an expression as a graph display object according to positions on the display screen, the positions being designated by a user; generating an operation receiver for changing a numerical value of a coefficient included in the determined expression, according to an operation of the user; displaying the graph of the determined expression and the generated operation receiver on the display screen; and changing the graph displayed on the display screen, according to the operation of the user on the displayed operation receiver.

12 Claims, 9 Drawing Sheets

(56) References Cited

U.S. PATENT DOCUMENTS

| | | | |
|---|---|---|---|
| 5,532,946 A | 7/1996 | Phipps et al. | |
| 5,539,427 A | 7/1996 | Bricklin et al. | |
| 5,539,867 A | 7/1996 | Handa et al. | |
| 5,553,225 A | 9/1996 | Perry | |
| 5,739,823 A | 4/1998 | Akaza et al. | |
| 5,825,355 A | 10/1998 | Palmer et al. | |
| 5,999,193 A | 12/1999 | Conley et al. | |
| 6,133,924 A | 10/2000 | Ito et al. | |
| 6,208,343 B1 | 3/2001 | Roth | |
| 6,256,595 B1 | 7/2001 | Schwalb et al. | |
| 6,429,869 B1 | 8/2002 | Kamakura et al. | |
| 6,532,469 B1 | 3/2003 | Feldman et al. | |
| 6,549,923 B1 | 4/2003 | Sudoh | |
| 6,918,768 B2 | 7/2005 | Bardige et al. | |
| 6,922,816 B1 | 7/2005 | Amin et al. | |
| 6,941,359 B1 | 9/2005 | Beaudoin et al. | |
| 7,289,120 B2 * | 10/2007 | Fukaya | G06F 1/1626 345/440 |
| 7,747,981 B2 | 6/2010 | Gray | |
| 7,765,491 B1 | 7/2010 | Cotterill | |
| 8,089,482 B1 | 1/2012 | Axelrod | |
| 8,259,115 B2 | 9/2012 | Okano | |
| 8,407,580 B2 | 3/2013 | Gray et al. | |
| 8,413,116 B2 | 4/2013 | Gray | |
| 9,098,858 B2 | 8/2015 | Xia et al. | |
| 9,202,433 B2 | 12/2015 | Webb et al. | |
| 9,507,495 B2 | 11/2016 | Johansson et al. | |
| 2002/0016697 A1 | 2/2002 | Nishigaki et al. | |
| 2003/0182333 A1 | 9/2003 | Good et al. | |
| 2004/0083247 A1 | 4/2004 | Koont | |
| 2004/0114258 A1 | 6/2004 | Harris, III et al. | |
| 2004/0135826 A1 | 7/2004 | Pickering | |
| 2004/0227738 A1 | 11/2004 | Sudoh | |
| 2005/0071785 A1 | 3/2005 | Chadzelek et al. | |
| 2005/0108234 A1 | 5/2005 | Oksanen et al. | |
| 2006/0204139 A1 | 9/2006 | Hayashi | |
| 2006/0253795 A1 | 11/2006 | Titov et al. | |
| 2007/0046674 A1 | 3/2007 | Sudoh | |
| 2007/0073705 A1 | 3/2007 | Gray | |
| 2007/0153001 A1 | 7/2007 | Yu et al. | |
| 2007/0195093 A1 | 8/2007 | Springer et al. | |
| 2007/0198620 A1 | 8/2007 | Nilakantan et al. | |
| 2007/0298389 A1 | 12/2007 | Yu et al. | |
| 2008/0143746 A1 | 6/2008 | Irons | |
| 2008/0250347 A1 | 10/2008 | Gray et al. | |
| 2008/0256489 A1 | 10/2008 | Maurer et al. | |
| 2009/0063206 A1 | 3/2009 | Payne et al. | |
| 2009/0073173 A1 | 3/2009 | Nakamura et al. | |
| 2009/0102846 A1 | 4/2009 | Flockermann et al. | |
| 2009/0115782 A1 | 5/2009 | Irons et al. | |
| 2009/0164886 A1 | 6/2009 | Shah et al. | |
| 2009/0281645 A1 | 11/2009 | Kitahara et al. | |
| 2009/0307587 A1 | 12/2009 | Kaneko | |
| 2010/0070931 A1 | 3/2010 | Nichols | |
| 2010/0099462 A1 | 4/2010 | Baek et al. | |
| 2010/0156830 A1 | 6/2010 | Homma et al. | |
| 2010/0231596 A1 | 9/2010 | Matsuda | |
| 2011/0004864 A1 | 1/2011 | Gray | |
| 2011/0043517 A1 | 2/2011 | Schneider et al. | |
| 2011/0227946 A1 | 9/2011 | Yoshizawa et al. | |
| 2011/0246943 A1 | 10/2011 | Fujibayashi | |
| 2011/0254862 A1 | 10/2011 | Okano | |
| 2011/0283188 A1 | 11/2011 | Farrenkopf et al. | |
| 2012/0030626 A1 | 2/2012 | Hopkins et al. | |
| 2012/0050328 A1 | 3/2012 | Karoji | |
| 2012/0159370 A1 | 6/2012 | Rode et al. | |
| 2012/0306879 A1 | 12/2012 | Yokoyama | |
| 2013/0050064 A1 | 2/2013 | Okano | |
| 2013/0097551 A1 | 4/2013 | Hogan | |
| 2013/0235069 A1 | 9/2013 | Ubillos et al. | |
| 2013/0268263 A1 | 10/2013 | Park et al. | |
| 2014/0075380 A1 | 3/2014 | Milirud et al. | |
| 2014/0096056 A1 | 4/2014 | Latzina | |
| 2014/0253542 A1 | 9/2014 | Jung et al. | |
| 2014/0282252 A1 | 9/2014 | Edwards et al. | |
| 2014/0317570 A1 | 10/2014 | Endo | |
| 2014/0359516 A1 | 12/2014 | O'Donoghue | |
| 2014/0365947 A1 | 12/2014 | Karoji | |
| 2015/0170372 A1 | 6/2015 | Rubins et al. | |
| 2015/0187105 A1 | 7/2015 | Endo et al. | |
| 2015/0187106 A1 | 7/2015 | Endo | |
| 2015/0268845 A1 | 9/2015 | Endo | |
| 2015/0310646 A1 | 10/2015 | Karoji et al. | |
| 2016/0004423 A1 | 1/2016 | Springer et al. | |
| 2016/0077725 A1 | 3/2016 | Maeda | |

FOREIGN PATENT DOCUMENTS

| | | |
|---|---|---|
| JP | 06175977 A | 6/1994 |
| JP | 08179749 A | 7/1996 |
| JP | 09050273 A | 2/1997 |
| JP | 09185586 A | 7/1997 |
| JP | 09198224 A | 7/1997 |
| JP | 09282475 A | 10/1997 |
| JP | 09282476 A | 10/1997 |
| JP | 11184822 A | 7/1999 |
| JP | 11328279 A | 11/1999 |
| JP | 2001350731 A | 12/2001 |
| JP | 2002117084 A | 4/2002 |
| JP | 2004199260 A | 7/2004 |
| JP | 2004206541 A | 7/2004 |
| JP | 2004326691 A | 11/2004 |
| JP | 2005107862 A | 4/2005 |
| JP | 2005107908 A | 4/2005 |
| JP | 2005107987 A | 4/2005 |
| JP | 2005182125 A | 7/2005 |
| JP | 2006120173 A | 5/2006 |
| JP | 2011013839 A | 1/2011 |
| JP | 2011181050 A | 9/2011 |
| JP | 2011185911 A | 9/2011 |
| JP | 2012014440 A | 1/2012 |
| JP | 2012203605 A | 10/2012 |
| JP | 2013045147 A | 3/2013 |
| JP | 2013050746 A | 3/2013 |
| JP | 2013178846 A | 9/2013 |
| WO | 2004029791 A2 | 4/2004 |

OTHER PUBLICATIONS

Hohenwarter, Judith, Markus Hohenwarter, and Geogebra Team. Introduction to Geogebra Version 4.4. International Geogebra Institute, 2013. Web. May 25, 2017.*

John D. Page, "Quadratic Function Explorer—Standard Form", Jan. 1, 2009, 3 Pages.

U.S. Appl. No. 14/854,773, First Named Inventor: Naoya Maeda; Title: "Figure Display Apparatus, Figure Display Method, and Storage Medium Storing Figure Display Program"; filed Sep. 15, 2015.

U.S. Appl. No. 14/298,586, First Named Inventor: Kosuke Karoji; Title: "Electronic Apparatus, Graph Display Method and Computer Readable Medium"; filed Jun. 6, 2014.

U.S. Appl. No. 14/254,594, First Named Inventor: Kota Endo; Title: "Graph Display Device, Graph Display Method and Computer-Readable Medium Recording Control Program"; filed Apr. 16, 2014.

U.S. Appl. No. 14/574,141, First Named Inventor: Kota Endo; Title: "Graph Display Control Device, Electronic Device, Graph Display Method and Storage Medium Recording Graph Display Control Processing Program"; filed Dec. 17, 2014.

U.S. Appl. No. 14/582,129, First Named Inventor: Kota Endo; Title: Graph Display Control Apparatus, Electronic Device, Graph Display Method, and Storage Medium Storing Graph Display Control Process Program; filed Dec. 23, 2014.

U.S. Appl. No. 14/657,851, First Named Inventor: Kota Endo; Title: "Graphic Drawing Device and Recording Medium Storing Graphic Drawing Program"; filed Mar. 13, 2015.

"Desmos", Desmos User Guide, http://s3.amazonaws.com/desmos/Desmos_Calculator_User_Guide.pdf, Feb. 2, 2013, 1-10.

"Fluid Math-2, Fluid Graphing Calculator for iPad", Sep. 20, 2012, https://www.youtube.com/watch?v=Nz8WP-NVXJc.

(56) References Cited

OTHER PUBLICATIONS

"Fluid Math-3, SmartBoard Math Software for Algebra Teachers", Feb. 25, 2012, https://www.youtube.com/watch?v=LRqOBK03g2E.

"FluidMath-1 Introduction—Tablet and Interactive Whiteboard Math Software", Mar. 2, 2011, https://www.youtube.com/watch?v=BAFGONn4KoQ.

"sketch2Graph iPad App (Tutorial)", Nov. 30, 2012, https://www.youtube.com/watch?v=0ss1MPU-TBE.

Graphing the Derivative as appearing on Nov. 15, 2013, available as http://web.archive.org/web/20131115154629/http://www.zweigmedia.com/RealWorld/calctopic1/derivgraph.html.

German Office Action dated Jan. 28, 2016, issued in German Application No. 102015206965.6.

Invitation to Oral Hearing dated Jul. 18, 2016 issued in German Application No. 10 2015 206 965.6.

Japanese Office Action dated Aug. 1, 2017 issued in counterpart Japanese Application No. 2013-271793.

Notice of Allowance dated Jun. 26, 2017 issued in U.S. Appl. No. 14/582,129.

rgilesmath7, Vertex Form With FluidMath, Jan. 17, 2011, <https://www.youtube.com/watch?v=I7U7WwhM-U>.

Japanese Office Action dated May 15, 2018 issued in counterpart Japanese Application No. 2014-161720.

\* cited by examiner

GRAPH DISPLAY APPARATUS, GRAPH DISPLAY METHOD AND PROGRAM RECORDING MEDIUM

CROSS-REFERENCE TO RELATED APPLICATION

This application claims priority based on Japanese Patent Application No. 2014-161720, filed on Aug. 7, 2014, the entire contents of which are incorporated by reference herein.

BACKGROUND OF THE INVENTION

The present invention relates to a graph display apparatus and a graph display method and a program recording medium for displaying graphs corresponding to mathematical expressions.

In the related art, electronic devices called graph function calculators have been made into products. Those graph function calculators display graphs if users inputs mathematical expressions corresponding to the graphs.

It is also possible to execute graph display application programs in tablet type electronic devices such that those electronic devices display graphs according to mathematical expressions.

A graph is a visual representation of the characteristics of a function. Therefore, in learning mathematics, it is performed to change coefficient values of terms included in function expressions are changed, thereby changing the forms of graphs displayed. In a case of changing a coefficient value, it is necessary for a user to operate a graph function calculator such that the graph function calculator displays a screen for setting the coefficient value, and newly input a numerical value for the corresponding coefficient by operating keys (in a case of a tablet terminal, by operating keys of a software keyboard).

Meanwhile, it has been considered a graph function electronic calculator which displays sliders for changing numerical values, thereby enabling a user to change coefficient values of mathematical expressions by operating the sliders. However, in order to display the sliders, complicated operations are necessary.

Also, it has been considered a bar graph display method of changing a threshold value for a bar graph by a slider and redrawing the corresponding bar graph (for example, JP-A-H11-328279).

For example, a beginner in mathematics may not know what expression the beginner should input to make a graph which is a learning object be displayed in a desired form. Also, it can be considered to display a keyboard for inputting mathematical expressions on a display unit in a device such as a calculator having a restricted display area such that a user can use the keyboard to input mathematical expressions. In this case, a problem in which individual keys are small and thus are difficult to be operated occurs.

The present invention was made in view of those problems, and an object of the present invention is to provide a graph display apparatus and display method (and a program recording medium thereof) which can easily generate and display a graph in a form desired by a user.

SUMMARY OF THE INVENTION

According to an aspect of the present invention, a graph display apparatus includes a display unit and a processor. The display unit includes a display screen. The processor performs following processes of: determining an expression as a graph display object according to positions on the display screen, the positions being designated by a user; generating an operation receiver for changing a numerical value of a coefficient included in the determined expression, according to an operation of the user; displaying the graph of the determined expression and the generated operation receiver on the display screen; and changing the graph displayed on the display screen, according to the operation of the user on the displayed operation receiver.

According to the present invention, it becomes possible to easily display a graph desired by a user.

DETAILED DESCRIPTION

Hereinafter, embodiments of the present invention will be described with reference to the accompanying drawings.

Figure 1:
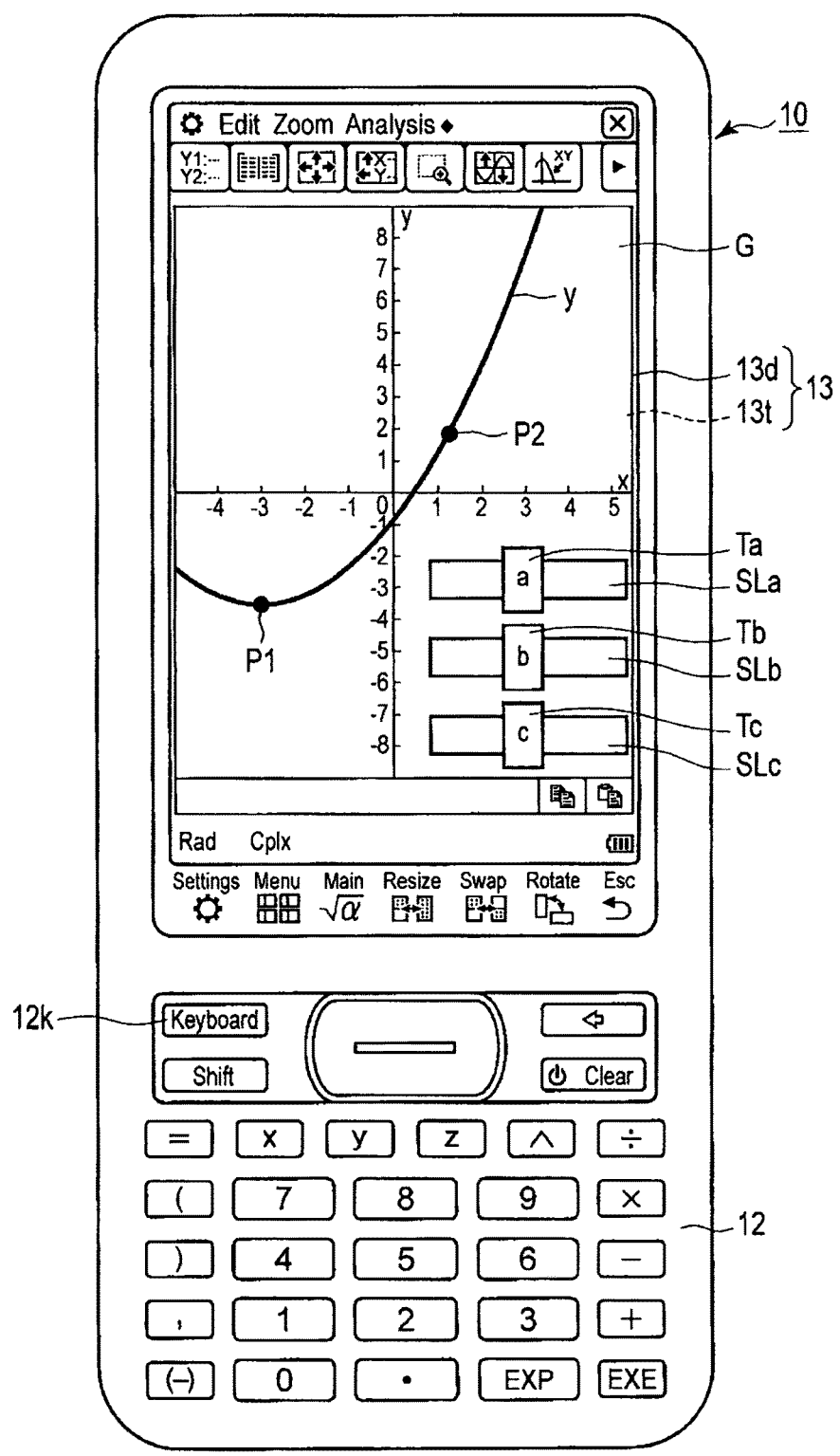
FIG. 1 is a front view illustrating the configuration of the external appearance of a graph function calculator 10 according to an embodiment of the present invention.

FIG. 1 is a front view illustrating the configuration of the external appearance of a graph function calculator 10 according to an embodiment of a graph display apparatus of the present invention.

Although the graph display apparatus is configured as the dedicated graph function calculator 10 to be described below, it may be configured by installing a graph display application program in a tablet terminal, a portable phone, a portable game console, or the like.

In the main body of the graph function calculator 10, in a range corresponding to about the lower one-third of the front surface of the main body, a key input unit 12 is provided, and in a range corresponding to about the upper two-thirds of the front surface, a touch panel display unit 13 is provided.

The key input unit 12 includes numeric keys, symbol keys such as "x", "y", and "z", four fundamental arithmetic operator keys, and so on.

A "Keyboard" key 12k can be operated to display a software keyboard on the touch panel display unit 13. If the "Keyboard" key 12k is operated, various function keys such as "sin", "cos", "tan", and "√" are displayed as a software keyboard in a lower portion of the display unit such that a user can select an arbitrary function key and perform inputting. If the "Keyboard" key 12k is operated again, the corresponding software keyboard is deleted.

The touch panel display unit 13 is configured by putting a transparent touch panel 13t on a liquid crystal display screen 13d capable of color display.

Also, the graph function calculator 10 has a function of displaying an arbitrary graph image in response to user's operations (a graph display mode).

In the graph display mode, a graph coordinate screen G is displayed. Then, if a plurality of points is designated by user's operations, a graph expression (y=f(x)) is computed, and a graph is displayed together with sliders for changing coefficients included in the expression.

Figure 2:
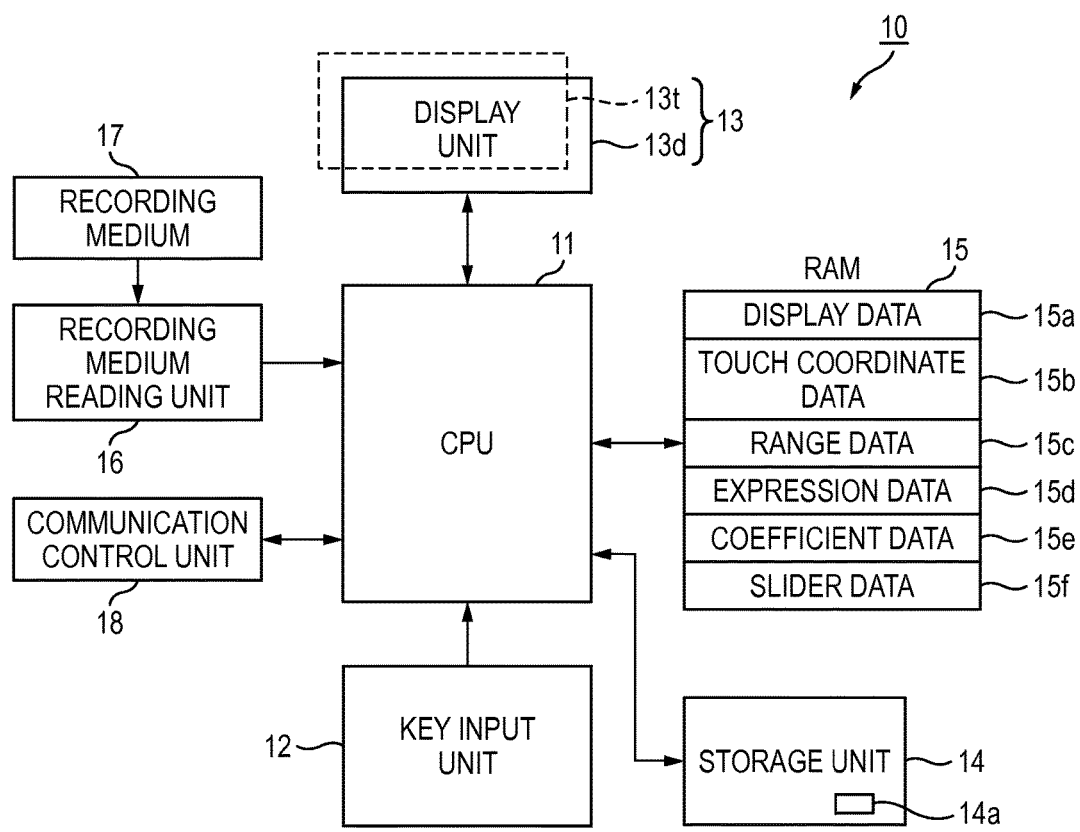
FIG. 2 is a block diagram illustrating the circuit configuration of the graph function calculator 10.

FIG. 2 is a block diagram illustrating the circuit configuration of the graph function calculator 10.

The graph function calculator 10 includes a CPU 11 which is a micro computer.

The CPU 11 uses a RAM 15, as a memory for work, to control operations of individual circuit units according to a calculator control program 14a stored in advance in a storage device 14 such as a flash ROM, thereby performing various functions of the graph function calculator 10, such as a calculator function and a graph display function. Also, the calculator control program 14a may be loaded from an external recording medium 17 such as a memory card into the storage unit 14 through a recording medium reading unit 16, or may be downloaded from a Web server (a program server) on a communication network (the Internet) into the storage device 14 through a communication control unit 18.

The CPU 11 is connected to the key input unit 12, the touch panel display 13, the storage device 14, the RAM 15, the recording medium reading unit 16, the communication control unit 18, and so on.

The RAM 15 stores various data necessary for processing operations of the CPU 11. This RAM 15 has a display data storage area 15a where data to be displayed in color on the screen of the touch panel display 13 is developed, a touch coordinate data storage area 15b, a range data storage area 15c, an expression data storage area 15d, a coefficient data storage area 15e, a slider data storage area 15f, and so on.

In the touch coordinate data storage area 15b, coordinate data of touch positions according to user's operations detected by the touch panel display 13 is stored.

In the range data storage area 15c, an X coordinate range (from Xmin to Xmax) and a Y coordinate range (from Ymin to Ymax) are stored as range data which represent a display range for a graph y which is set with respect to the graph coordinate screen G of the touch panel display 13.

In the expression data storage area 15d, data on an expression (a graph expression) "y=f(x)" which is calculated if the user designates a plurality of points on the graph coordinate screen G is stored.

In the coefficient data storage area 15e, data on numerical values (coefficient values) of coefficients a, b, and c which are included in the expression (y=f(x)) stored in the expression data storage area 15d is stored.

In the slider data storage area 15f, data on sliders SL which are operation receivers for designating numerical values of the individual coefficients included in the expression (y=f(x)) according to user's operations is stored. This data includes data on the shape and color of each slider, a current value (Current) based on a knob T of each slider, and the minimum value (Min) and maximum value (Max) of a movement range in which each knob T can move.

Also, a unit change amount (Dot) according to movement of a knob T is a numerical-value change amount corresponding to a movement width corresponding to one display dot in the movement range (from the minimum value (Min) to the maximum value (Max)) of the corresponding knob T.

The CPU 11 controls the operations of the individual circuit units according to commands for various processes described in the calculator control program 14a, whereby software and hardware operate in cooperation with each other, whereby the graph function calculator 10 configured as described above implements various functions to be described in the following operation description.

Now, operations of the graph function calculator 10 having the above described configuration will be described.

First Embodiment

Figures 3, 4:
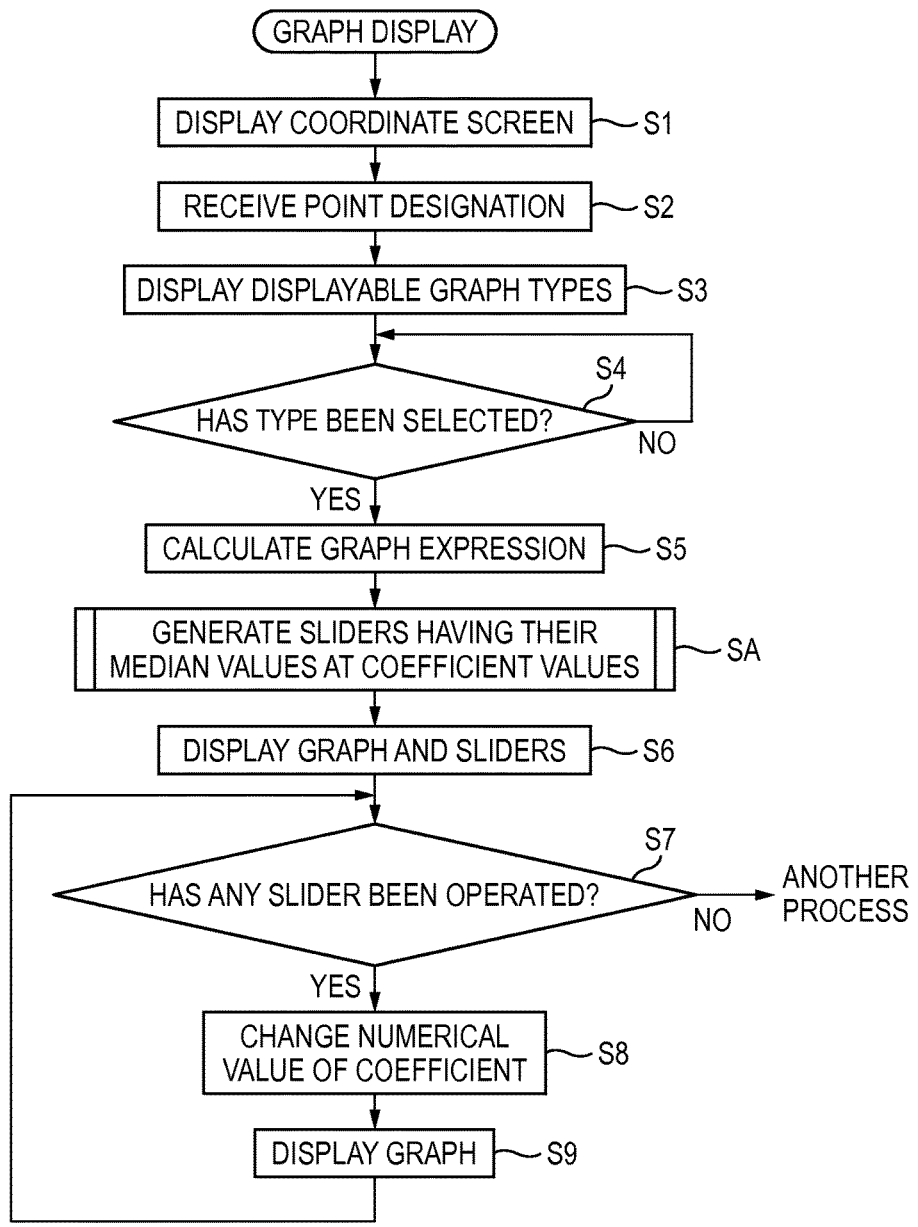
FIG. 3 is a flow chart illustrating a graph display process of a first embodiment.
FIG. 4 is a view illustrating a graph type table which is used in the graph display process of the first embodiment.

FIG. 3 is a flow chart illustrating a graph display process of a first embodiment of the graph function calculator 10.

FIG. 4 is a view illustrating a graph type table for setting a graph type to be displayed according to the number of points Pn which are designated on the graph coordinate screen G.

Figure 5:
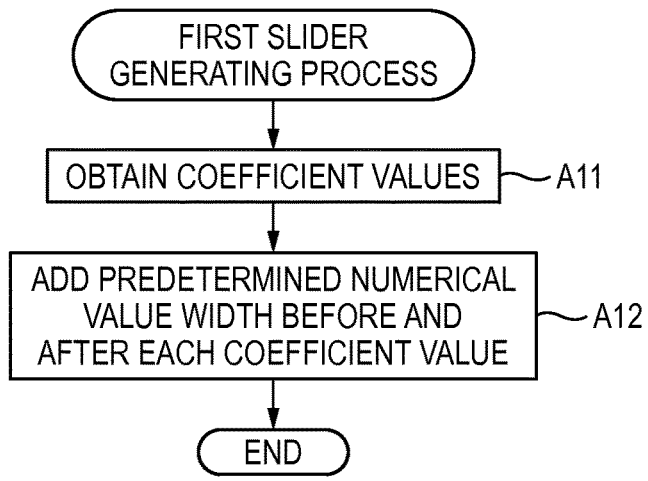
FIG. 5 is a flow chart illustrating a first slider generating process (1) of the first embodiment.

FIG. 5 is a flow chart illustrating a first slider generating process (1) according to the graph display process.

Figure 6:
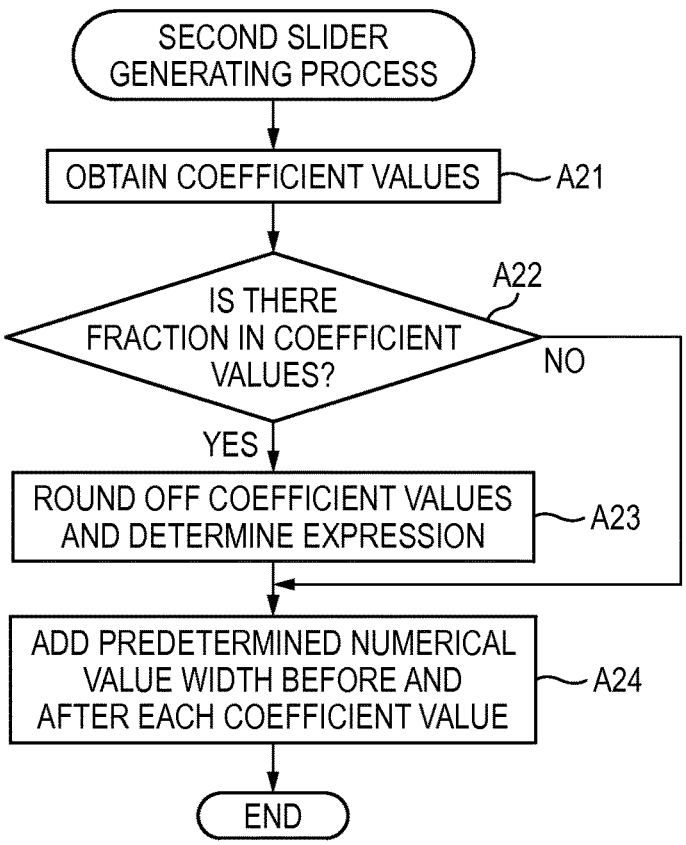
FIG. 6 is a flow chart illustrating a second slider generating process (2) of the first embodiment.

FIG. 6 is a flow chart illustrating a second slider generating process (2) according to the graph display process.

FIGS. 7A to 7D are views illustrating display operations corresponding to user's operations.

Figure 7A:
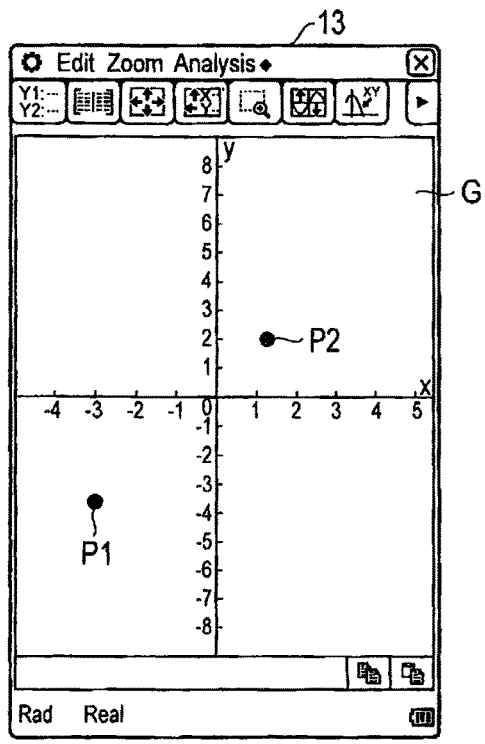
FIGS. 7A to 7D are views illustrating display operations of the first embodiment of the graph function calculator 10.

If the graph display mode is designated on a main screen (not shown) according to a user's operation, in STEP S1, a graph coordinate screen G corresponding to predetermined x-axis and y-axis coordinate ranges is generated, and is displayed on the touch panel display unit 13 as shown in FIG. 7A.

Figure 7B:
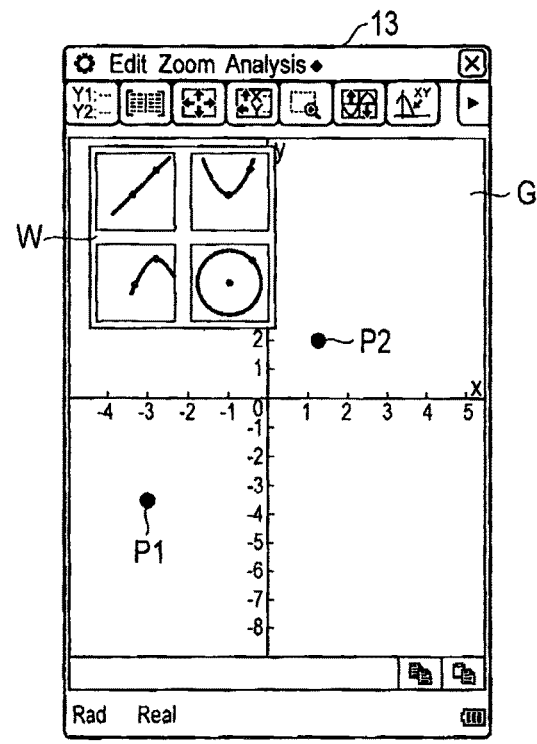

If the user estimates the trajectory of a desired graph and designates a plurality of points P on the graph coordinate screen G (13) by touch operations in order to make the desired graph be displayed, in STEP S2, those designated points are received. Then, in STEP S3, graph types displayable according to the designated points are displayed as a graph type selection window W as shown in FIG. 7B. Also, as a method of designating a plurality of points, a plurality of points may be designated one by one, or a plurality of points touched may be detected at the same time.

In the present embodiment, in a case of designating two points P1 and P2, it is possible to display the graph of a straight line passing through the designated points P1 and P2, the graph of a quadratic function having its vertex at one of the designated points and passing through the other point, and the graph of a circle having its center at the designated point P1 and passing through the point P2. Also, in a case of designating three points P1, P2, and P3, it is possible to display the graph of a quadratic function or a circle passing through those three designated points.

If two points P1 and P2 are designated by touch operations, a graph type selection window W including, as displayable graph types, a straight line graph, two quadratic function graphs which open upwards and downwards, respectively, and a circle graph is displayed such that it is possible to select any one from them.

Then, if the user selects, for example, the quadratic function graph which opens upwards from the listed graph types ("Yes" in STEP S4), in STEP S5, an expression (a quadratic function expression "y=ax$^2$+bx+c") having its vertex at the designated point P1 and passing through the coordinates of the designated point P2 is calculated.

Subsequently, in STEP SA, coefficient sliders SLa, SLb, and SLc are generated such that the numerical values of the individual coefficients (a, b, and c) become the median values of corresponding numerical value ranges (initial positions of their knobs Ta, Tb, and Tc).

With reference to FIG. 5, a first slider generating process will be described. In the first slider generating process, first, in STEP A11, the numerical values of the coefficients a, b, and c included in the calculated expression are obtained. Subsequently, in STEP A12, coefficient sliders SLa, SLb, and SLc having numerical value ranges having the obtained numerical values of the coefficients a, b, and c as their median values and having a predetermined numerical value width before and after the median values are generated.

Figure 7C:
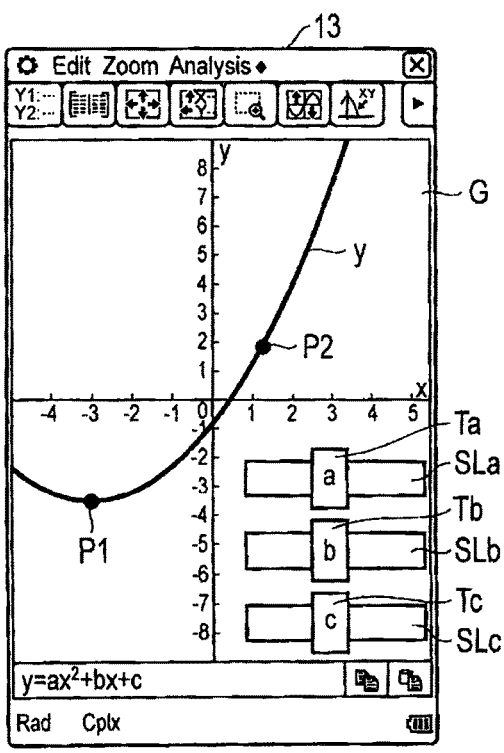

If the sliders are generated, in STEP S6, a graph y corresponding to the calculated quadratic function expression is displayed together with the generated coefficient sliders SLa, SLb, and SLc as shown in FIG. 7C.

Figure 7D:
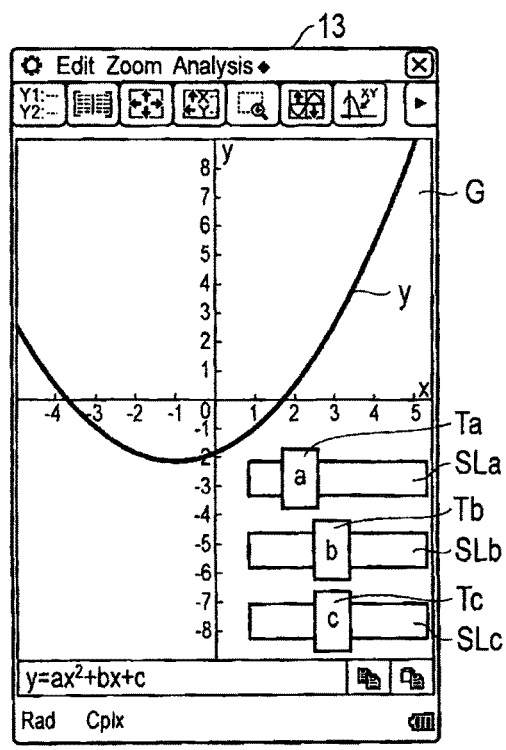

Then, if any one of the knobs Ta, Tb, and Tc of the coefficient sliders SLa, SLb, and SLc (here, the knob Ta) is moved by an operation of the user as shown in FIG. 7D ("Yes" in STEP S7), in STEP S8, the numerical value of the coefficient "a" of the expression is changed according to the movement amount of the knob Ta.

Subsequently, in STEP S9, a graph y corresponding to an expression obtained by changing the numerical value of the coefficient "a" is re-displayed.

Therefore, the user can easily make a graph close to an imaged graph y be displayed only by designating two or three points on the imaged graph y and selecting a graph type for the graph y. Further, the user can easily change the numerical value of a coefficient included in the expression of the graph y by a slider SL for the corresponding coefficient, thereby changing the shape of the graph y.

Also, the sliders may be generated by a process shown in FIG. 6.

In a second slider generating process shown in FIG. 6, in a case where the calculated expression is a quadratic function, first, in STEP A21, the numerical values of the coefficients a, b, and c included in the calculated expression are obtained. Subsequently, in STEP A22, whether there is a fraction in the numerical values of the coefficients a, b, and c is determined. A fraction means a fractional part in a case where a fractional value is obtained as a coefficient.

In a case where it is determined that there is a fraction in the numerical values of the coefficients ("Yes" in STEP A22), in STEP A23, that fraction is rounded off, whereby an integer is obtained, and an expression having integers as the coefficients a, b, and c is determined.

Subsequently, in STEP A24, coefficient sliders SLa, SLb, and SLc having numerical value ranges having the integers which are the numerical values of the coefficients a, b, and c, as their median values, and having a predetermined numerical value width before and after the median values are generated.

Meanwhile, in a case where there is no fraction in the numerical values of the coefficients ("No" in STEP A22), in STEP A24, similarly in the first slider generating process, coefficient sliders SLa, SLb, and SLc having numerical value ranges having the numerical values of the coefficients a, b, and c as their median values and having a predetermined numerical value width before and after the median values are generated.

In a case of generating the coefficient sliders SL according to the second slider generating process, the numerical values of the coefficients a, b, and c do not include any fraction and are easy to be analyzed by the user, and it is possible to change those numerical values, thereby changing the graph y.

Second Embodiment

Figure 8:
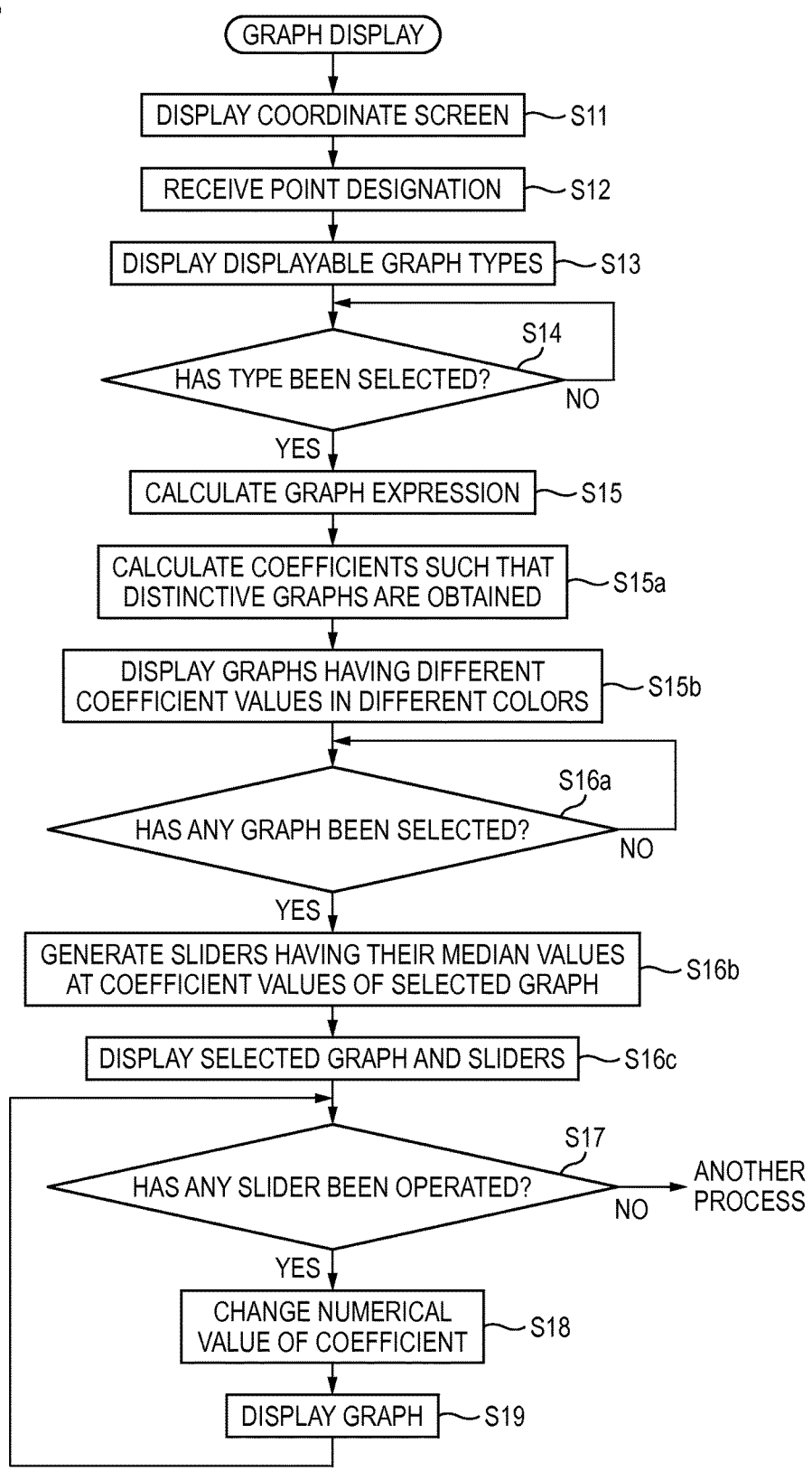
FIG. 8 is a flow chart illustrating a graph display process of a second embodiment.

FIG. 8 is a flow chart illustrating a graph display process of a second embodiment of the graph function calculator 10.

Figure 9:
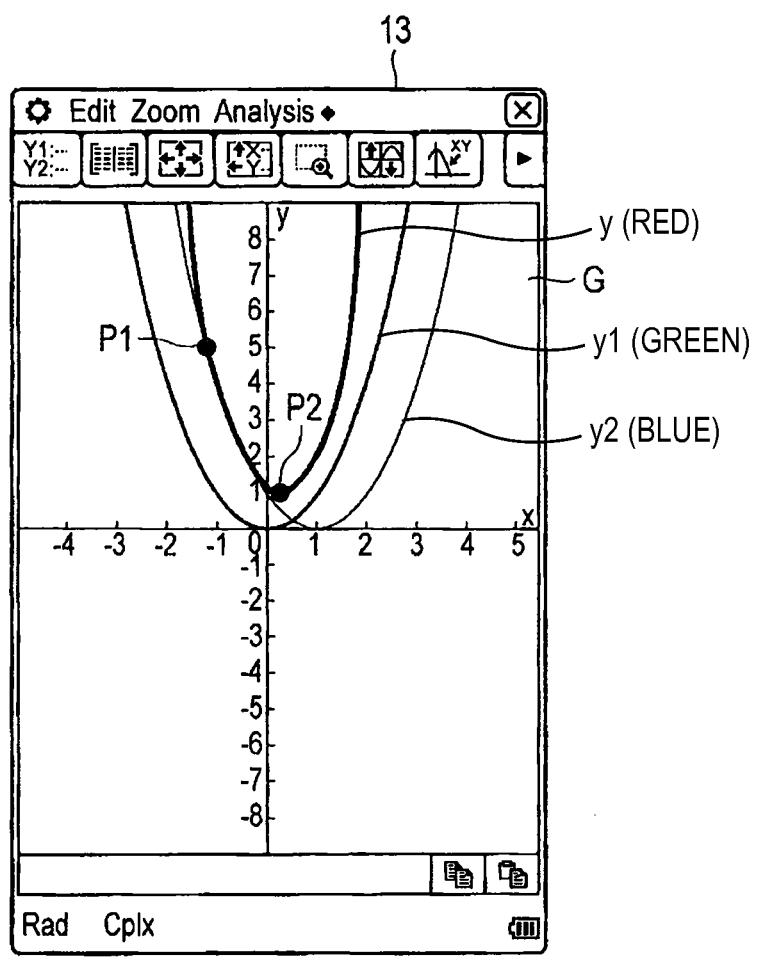
FIG. 9 is a view illustrating a display operation of a graph coordinate screen G of the second embodiment.

FIG. 9 is a view illustrating a display operation of a graph coordinate screen G according to the graph display process of the second embodiment.

In the graph display process of the second embodiment, the processes of STEPS S11 to S15 and STEPS S17 to S19 are identical to the processes of STEPS S1 to S5 and STEPS S7 to S9 of the graph display process of the first embodiment, and thus detailed descriptions of the processes of STEPS S11 to S15 and STEPS S17 to S19 are omitted.

In STEP S11, a graph coordinate screen G is displayed on the touch panel display unit 13. If the user designates two points P1 and P2 on an imaged graph by touch operations in STEP S12, in STEP S13, a graph type selection window W is displayed. Then, if the user selects a type "QUADRATIC FUNCTION" from a graph type selection window W ("Yes" in STEP S14), in STEP S15, an expression (a quadratic function expression "$y=ax^2+bx+c$") is calculated. In this case, it is assumed that the point P2 is designated at a position close to an origin O.

Next, in STEP S15a, numerical values of the coefficients a, b, and c of the expression are calculated such that graphs yn having substantially same shapes as that of a graph y corresponding to the calculated expression and having distinctive characteristics in which each graph passes through the origin or is in contact with a coordinate axis.

Thereafter, in STEP S15b, the graph y passing through the two designated points P1 and P2, a graph y1 having a substantially same shape as that of the graph y and passing through the origin, and a graph y2 having a substantially same shape as that of the graph y and being in contact with an x axis are displayed in different display colors on the graph coordinate screen G For example, the graph y, the graph y1, and the graph y2 are displayed in red, green, and blue, respectively.

Then, if the user selects a desired graph yn from the displayed graphs y (red), y1 (green), and y2 (blue) by touch ("Yes" in STEP S16a), in STEP S16b, coefficient sliders SLa, SLb, and SLc are generated such that the numerical values of the individual coefficients (a, b, and c) included in the expression of the selected graph yn become the median values of corresponding numerical value ranges (initial positions of their knobs Ta, Tb, and Tc).

Thereafter, in STEP S16c, the selected graph yn and the generated coefficient sliders SLa, SLb, and SLc are displayed together on the graph coordinate screen G.

Then, if the knob T of a coefficient slider SL is moved according to an operation of the user ("Yes" in STEP S17), in STEP S18, the numerical value of a corresponding one of the coefficients a, b, and c of the expression is changed according to the movement amount of the knob T, whereby the graph yn is deformed. The deformed graph is re-displayed in STEP S19.

Third Embodiment

Figure 10:
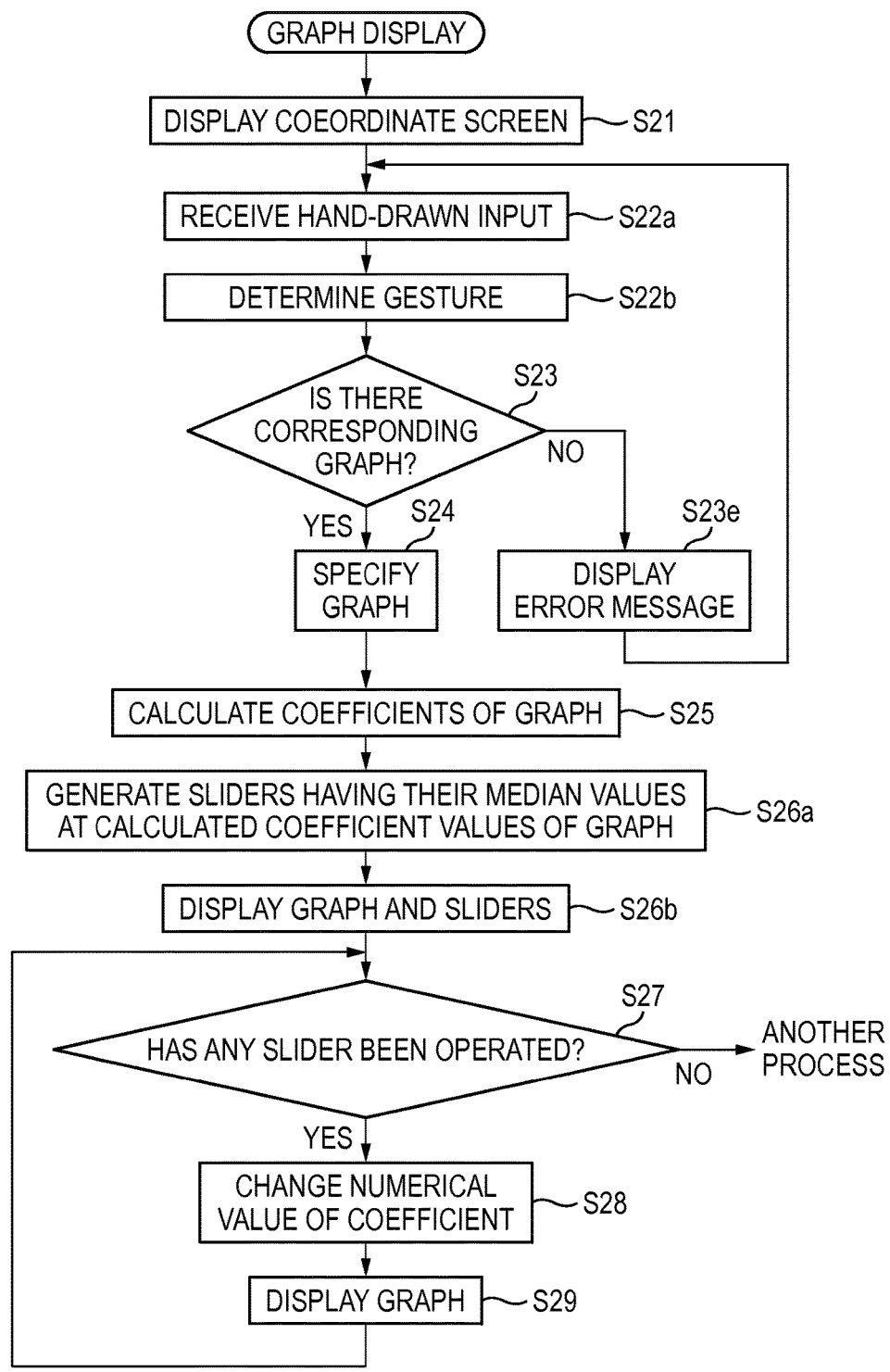
FIG. 10 is a flow chart illustrating a graph display process of a third embodiment.

FIG. 10 is a flow chart of a graph display process of a third embodiment of the graph function calculator 10.

In the graph display process of the third embodiment, the user draws an imaged graph on the touch panel display unit 13 by hand, thereby specifying what function graph is a graph y corresponding to the hand-drawn trajectory, whereby the specified graph y and coefficient sliders SL corresponding to the expression of the graph y are displayed together.

In the graph display process of the third embodiment, the processes of STEP S21 and STEPS S27 to S29 are identical to the processes of STEP S1 and STEPS S7 to S9 of the graph display process of the first embodiment, and thus detailed descriptions of them are omitted.

Figure 11A:
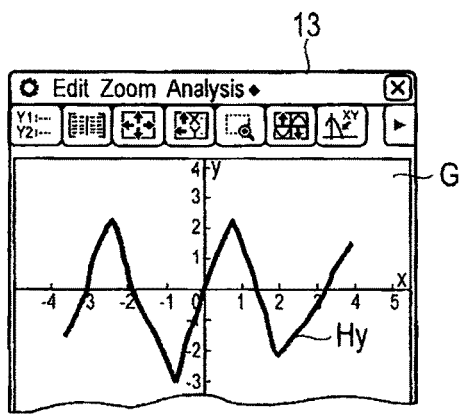
FIGS. 11A and 11B are views illustrating display operations of the third embodiment.
Figure 11B:
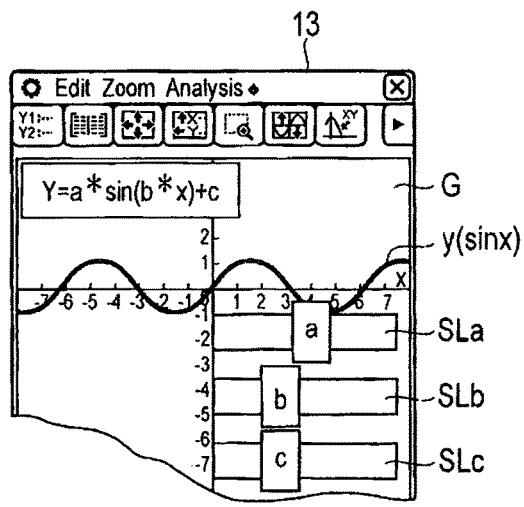

FIGS. 11A and 11B are views illustrating display operations of the graph display process of the third embodiment.

In STEP S21, a graph coordinate screen G is displayed on the touch panel display unit 13. For example, if the user performs hand-drawing in a zigzag shape according to an imaged sine function graph as shown in FIG. 11A (STEP S22a), in STEP S22b, the gesture of the user corresponding to that hand-drawing is determined (analyzed). Subsequently, in STEP S23, whether a graph having a form corresponding to that gesture is in various graph models stored in advance is determined.

If it is determined that there is a graph model according to the zigzag gesture ("Yes" in STEP S23), and it is specified in STEP S24 that a corresponding graph type is a sine function graph y (sin x), in STEP S25, numerical values of individual coefficients a, b, and c included in the expression "y=a·sin(bx)+c" of the graph y (sin x) are calculated.

Subsequently, in STEP S26a, coefficient sliders SLa, SLb, and SLc are generated such that the numerical values calculated with respect to the coefficients a, b, and c included in the expression "y=a·sin(bx)+c" become the median values of corresponding numerical value ranges (initial positions of their knobs Ta, Tb, and Tc).

Subsequently, in STEP S26b, the sine function graph y (sin x) and the generated coefficient sliders SLa, SLb, and SLc are displayed together as shown in FIG. 11B.

Then, if the knob K of a coefficient slider SL is moved by the user ("Yes" in STEP S27), in STEP S28, the numerical value of a corresponding coefficient of the expression is changed, whereby the graph y (sin x) is deformed. The deformed graph is re-displayed in STEP S29.

Meanwhile, in a case where it is determined in STEP S23 that there is no graph model corresponding to the hand-drawn trajectory Hy ("No" in STEP S23), in STEP S23e, an error message is displayed.

Figure 12A:
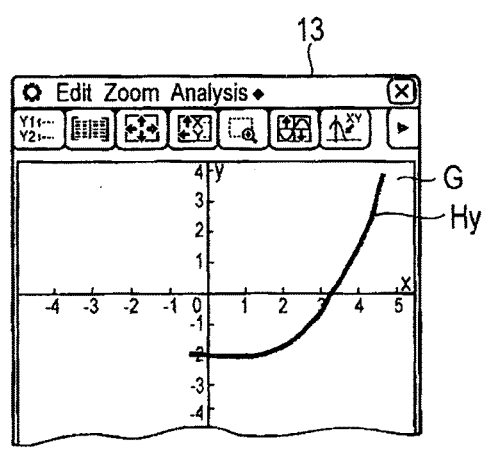
FIGS. 12A and 12B are views illustrating other display operations of the third embodiment.
Figure 12B:
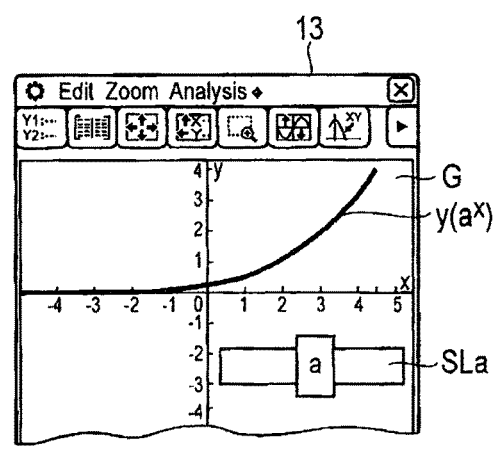

FIGS. 12A and 12B are views illustrating other display operations of the third embodiment.

If the user performs hand-drawing in an exponential curve shape according to an imaged exponential function graph as shown in FIG. 12A, according to a graph display process (STEPS S27 to S29) as described above, an exponential function graph y (a$^x$) and a coefficient slider SLa are displayed as shown in FIG. 12B.

Also, in each embodiment described above, coefficient sliders are used as operation receivers. However, the present invention is not limited thereto. The operation receivers may have any other shapes as long as they can be operated to change numerical values by a user.

In the embodiments described above, every process of the graph function calculator 10 shown by a flow chart can be stored, as a program executable in a computer, in a medium (17) of an external recording device, such as a memory card (such as a ROM card or a RAM card), a magnetic disk (such as a floppy disk or a hard disk), an optical disk (such as a CD-ROM or a DVD), or a semiconductor memory, to be distributed. Further, a computer (a control device) (11) of an electronic device having a display unit (13) for receiving user's inputs loads the program stored in the medium (17) of the external storage device into a storage device (14), and operations of the computer is controlled by the loaded program, whereby it is possible to implement the graph display function described in each embodiment described above, and to implement the same process according to the above described method.

The present invention is not limited to the above embodiments, and can be modified in various forms in the implementation phase, without departing from the spirit or character thereof. The embodiments each include inventions of different stages and therefore various inventions can be extracted by combining suitably a plurality of structural requirements disclosed in the embodiments. For example, even if some are removed from all of the structural requirements shown in the embodiments or some structural requirements are combined in a different mode, the resulting configuration can be extracted as an invention, provided that the object to be achieved by the invention is accomplished and the effect of the invention is obtained.

What is claimed is:
1. A graph display apparatus comprising:
a display that includes a display screen; and
a processor that performs processes comprising:
when positions on the display screen are designated by a user as designated points, determining, according to the designated points, (i) a first expression including coefficients as a graph display object and (ii) first numerical values as numerical values of the coefficients, wherein the determined first expression corresponds to a first graph image;
additionally determining second numerical values as numerical values of coefficients of a second expression corresponding to a second graph image which is at least one distinctive graph image which has distinctive characteristics and which is similar to the first graph image;
displaying, on the display screen, (i) the first graph image corresponding to the first expression including the coefficients having the first numerical values, and (ii) the second graph image corresponding to the second expression including the coefficients having the second numerical values;
displaying, when the user selects the first graph image, the selected first graph image and a generated first operation receiver for changing, according to an operation of the user, the numerical value of each coefficient included in the first expression corresponding to the first graph image;
displaying, when the user selects the second graph image, the selected second graph image and a generated second operation receiver for changing, according to an operation of the user, the numerical value of each coefficient included in the second expression corresponding to the second graph image;
in a case in which the first graph image is selected and the first graph image and the first operation receiver are displayed, and the user operates the first operation receiver to change the numerical value of at least one of the coefficients of the first expression, changing the first graph image which is displayed on the display screen, according to the first expression in which the numerical value of at least one of the coefficients is changed from the first numerical value to a changed numerical value; and
in a case in which the second graph image is selected and the second graph image and the second operation receiver are displayed, and the user operates the second operation receiver to change the numerical value of at least one of the coefficients of the second expression, changing the second graph image which is displayed on the display screen, according to the second expression in which the numerical value of at least one of the coefficients is changed from the second numerical value to a changed numerical value, wherein:

the processor further performs processes comprising:
displaying different graph types as displayable graphs according to a number of positions designated on the display screen by the user; and receiving a user selection when the user selects one graph type among the displayed graph types; and in the expression determining process, the processor determines the first expression and the first numerical values of the coefficients based on the positions of the designated points and the received graph type.

2. The graph display apparatus according to claim 1, wherein:

in the expression determining process, the processor calculates the first expression as the graph display object according to the positions designated on the display screen by the user, the first operation receiver includes plural first operation receivers for respectively changing the numerical values of each coefficient included in the first expression, and each of the first operation receivers includes a numerical value range having a median value at the first numerical value of the corresponding coefficient included in the calculated first expression, the second operation receiver includes plural second operation receivers for respectively changing the numerical values of each coefficient included in the second expression, and each of the second operation receivers includes a numerical value range having a median value at the second numerical value of the corresponding coefficient included in the second expression, and each of the first operation receivers and the second operation receivers is operable to change a numerical value in the numerical value range.

3. The graph display apparatus according to claim 1, wherein:

in the expression determining process, the processor specifies a graph type based on consecutive positions designated on the display screen by the user, to determine the first expression according to the specified graph type.

4. The graph display apparatus according to claim 1, wherein the at least one distinctive graph image includes a graph image which passes through an origin or a graph image which is in contact with a coordinate axis.

5. A graph display method of a graph display apparatus including a display having a display screen, the method comprising:

when positions on the display screen are designated by a user as designated points, determining, according to the designated points, (i) a first expression including coefficients as a graph display object and (ii) first numerical values as numerical values of the coefficients, wherein the determined first expression corresponds to a first graph image;

additionally determining second numerical values as numerical values of coefficients of a second expression corresponding to a second graph image which is at least one distinctive graph image which has distinctive characteristics and which is similar to the first graph image;

displaying, on the display screen, (i) the first graph image corresponding to the first expression including the coefficients having the first numerical values, and (ii) the second graph image corresponding to the second expression including the coefficients having the second numerical values;

displaying, when the user selects the first graph image, the selected first graph image and a generated first operation receiver for changing, according to an operation of the user, the numerical value of each coefficient included in the first expression corresponding to the first graph image;

displaying, when the user selects the second graph image, the selected second graph image and a generated second operation receiver for changing, according to an operation of the user, the numerical value of each coefficient included in the second expression corresponding to the second graph image;

in a case in which the first graph image is selected and the first graph image and the first operation receiver are displayed, and the user operates the first operation receiver to change the numerical value of at least one of the coefficients of the first expression, changing the first graph image which is displayed on the display screen, according to the first expression in which the numerical value of at least one of the coefficients is changed from the first numerical value to a changed numerical value; and in a case in which the second graph image is selected and the second graph image and the second operation receiver are displayed, and the user operates the second operation receiver to change the numerical value of at least one of the coefficients of the second expression, changing the second graph image which is displayed on the display screen, according to the second expression in which the numerical value of at least one of the coefficients is changed from the second numerical value to a changed numerical value;

wherein the method further comprises:

displaying different graph types as displayable graphs according to the number of positions designated on the display screen by the user; and receiving a user selection when the user selects one graph type among the displayed graph types; and wherein the first expression and the first numerical values of the coefficients are determined based on the positions of the designated points and the received graph type.

6. The graph display method according to claim 5, wherein:

determining the first expression includes calculating the first expression as the graph display object according to the positions designated on the display screen by the user, the first operation receiver includes plural first operation receivers for respectively changing the numerical values of each coefficient included in the first expression, and each of the first operation receivers includes a numerical value range having a median value at the first numerical value of the corresponding coefficient included in the calculated first expression, the second operation receiver includes plural second operation receivers for respectively changing the numerical values of each coefficient included in the second expression, and each of the second operation receivers includes a numerical value range having a median value at the second numerical value of the corresponding coefficient included in the second expression, and each of the first operation receivers and the second operation receivers is operable to change a numerical value in the numerical value range.

7. The graph display method according to claim 5, wherein:

in the determining of the first expression, a graph type is specified based on consecutive positions designated on the display screen by the user, and the first expression is determined according to the specified graph type.

8. The graph display method according to claim 5, wherein the at least one distinctive graph image includes a graph image which passes through an origin or a graph image which is in contact with a coordinate axis.

9. A non-transitory program recording medium storing a program that is executable by a computer including a processor and a display having a display screen, the program causing the processor to perform processes comprising:

when positions on the display screen are designated by a user as designated points, determining, according to the designated points, (i) a first expression including coefficients as a graph display object and (ii) first numerical values as numerical values of the coefficients, wherein the determined first expression corresponds to a first graph image;

additionally determining second numerical values as numerical values of coefficients of a second expression corresponding to a second graph image which is at least one distinctive graph image which has distinctive characteristics and which is similar to the first graph image;

displaying, on the display screen, (i) the first graph image corresponding to the first expression including the coefficients having the first numerical values, and (ii) the second graph image corresponding to the second expression including the coefficients having the second numerical values;

displaying, when the user selects the first graph image, the selected first graph image and a generated first operation receiver for changing, according to an operation of the user, the numerical value of each coefficient included in the first expression corresponding to the first graph image;

displaying, when the user selects the second graph image, the selected second graph image and a generated second operation receiver for changing, according to an operation of the user, the numerical value of each coefficient included in the second expression corresponding to the second graph image;

in a case in which the first graph image is selected and the first graph image and the first operation receiver are displayed, and the user operates the first operation receiver to change the numerical value of at least one of the coefficients of the first expression, changing the first graph image which is displayed on the display screen, according to the first expression in which the numerical value of at least one of the coefficients is changed from the first numerical value to a changed numerical value; and in a case in which the second graph image is selected and the second graph image and the second operation receiver are displayed, and the user operates the second operation receiver to change the numerical value of at least one of the coefficients of the second expression, changing the second graph image which is displayed on the display screen, according to the second expression in which the numerical value of at least one of the coefficients is changed from the second numerical value to a changed numerical value;

wherein:

the program further causes the processor to perform processes comprising:

displaying different graph types as displayable graphs according to the number of positions designated on the display screen by the user; and receiving a user selection when the user selects one graph type among the displayed graph types; and in the expression determining process, the processor determines the first expression and the first numerical values of the coefficients based on the positions of the designated points and the received graph type.

10. The program recording medium according to claim 9, wherein:

in the expression determining process, the program causes the processor to perform a process of calculating the first expression as the graph display object according to the positions designated on the display screen by the user, the first operation receiver includes plural first operation receivers for respectively changing the numerical values of each coefficient included in the first expression, and each of the first operation receivers includes a numerical value range having a median value at the first numerical value of the corresponding coefficient included in the calculated first expression, the second operation receiver includes plural second operation receivers for respectively changing the numerical values of each coefficient included in the second expression, and each of the second operation receivers includes a numerical value range having a median value at the second numerical value of the corresponding coefficient included in the second expression, and each of the first operation receivers and the second operation receivers is operable to change a numerical value in the numerical value range.

11. The program recording medium according to claim 9, wherein:

in the expression determining process, the program further causes the processor to perform a process of specifying a graph type based on consecutive positions designated on the display screen by the user, to determine the first expression according to the specified graph type.

12. The program recording medium according to claim 9, wherein the at least one distinctive graph image includes a graph image which passes through an origin or a graph image which is in contact with a coordinate axis.

* * * * *